(12) United States Patent
Koncelik, Jr.

(10) Patent No.: US 6,880,546 B1
(45) Date of Patent: Apr. 19, 2005

(54) BARBECUE GRILL WITH ASH DISCHARGE

(76) Inventor: Lawrence J Koncelik, Jr., 10 Gingerbread La., East Hampton, NY (US) 11937

( * ) Notice: Subject to any disclaimer, the term of this patent is extended or adjusted under 35 U.S.C. 154(b) by 0 days.

(21) Appl. No.: 10/441,230

(22) Filed: May 17, 2003

Related U.S. Application Data

(63) Continuation-in-part of application No. 09/907,176, filed on Jul. 18, 2001, now Pat. No. 6,631,712.

(51) Int. Cl.[7] .................................................. F24B 3/00
(52) U.S. Cl. .................... 126/25 C; 126/25 R; 126/242; 126/245
(58) Field of Search ............................. 126/25 R, 25 C, 126/242, 245, 41 R, 39 R; 110/171; 141/331–343, 86, 98, 337; 122/390–392, 40; 134/104.2, 22.1, 104.4, 123, 169 A; 184/106; 296/38; 248/94

(56) References Cited

U.S. PATENT DOCUMENTS

| | | | |
|---|---|---|---|
| 6,614 A | * | 7/1849 | Heermance .................. 74/410 |
| 1,045,359 A | | 11/1912 | Babbitt, Jr. |
| 1,055,311 A | | 3/1913 | Blount |

(Continued)

FOREIGN PATENT DOCUMENTS

| | | | |
|---|---|---|---|
| JP | 11-325502 | * | 11/1999 |

Primary Examiner—Carl D. Price
(74) Attorney, Agent, or Firm—Michael I. Kroll

(57) ABSTRACT

The present invention 10 discloses a system and device(s) for the discharge of the ash material contained within a barbecue unit 12 as fertilizer to a user designated area. The discharge is accomplished by introducing a quantity of water into the barbecue grill 12 where the ash will be suspended in solution and delivered by means of a conduit to a user-specified area. In one embodiment, the present invention is comprised of a funnel-like device 14 having a removable sieve 16, drain hose 18 with connector 20, and adjustable support legs 22. In other embodiments, the funnel 14 is connected to the grill 12 using straps 36 or magnetic straps 40. The present invention can also be used with a public use barbecue grill 56 with cover 62 with a pipe 58 forming an integral part therewith having a handle 60 for varying the alignment of the ash drain and air vents. Water is introduced into the barbecue grill 56 and on to the charcoal at the bottom of the grill. The resultant ash and water solution is washed out through the air duct holes at the bottom of the grill and into the support post drain pipe 58. The present invention can also be employed on a yacht 80 with ash drain tube 82 beneath the barbecue grill and fed along to a dump port 84 along the gunwale of a yacht. To discharge the ash, water is introduced into the barbecue grill 76 and on to the charcoal at the bottom of the grill. The resultant ash and water solution is washed out through the drain duct holes at the bottom of the grill and into the drain tube 82.

2 Claims, 11 Drawing Sheets

U.S. PATENT DOCUMENTS

| | | | |
|---|---|---|---|
| 1,095,504 A | | 5/1914 | Jannoch |
| 1,387,789 A | * | 8/1921 | Lyons ........................ 210/244 |
| 1,455,536 A | * | 5/1923 | Lebherz ........................ 248/94 |
| 2,894,448 A | * | 7/1959 | Henderson et al. ........... 99/444 |
| 3,033,191 A | | 5/1962 | Bonadiman |
| 3,126,881 A | | 3/1964 | Blotsky, Jr. |
| 3,209,743 A | | 10/1965 | Stewart et al. |
| 3,308,840 A | * | 3/1967 | Kelley .................... 134/167 R |
| 3,459,171 A | * | 8/1969 | Swanson .................. 126/25 R |
| 3,500,812 A | * | 3/1970 | Korngold .................. 126/25 R |
| 3,854,242 A | | 12/1974 | Gladstein |
| 4,229,904 A | | 10/1980 | Burton |
| 4,245,666 A | * | 1/1981 | Norris ........................ 137/357 |
| 4,763,640 A | | 8/1988 | Schnack et al. |
| 4,879,990 A | | 11/1989 | Clark |
| 4,895,134 A | * | 1/1990 | Fielding et al. .............. 126/243 |
| 4,909,137 A | | 3/1990 | Brugnoli |
| 4,995,137 A | | 2/1991 | Reichborn |
| 5,044,266 A | | 9/1991 | Geogaris |
| 5,052,149 A | | 10/1991 | Johnson |
| 5,219,006 A | * | 6/1993 | Bishop ......................... 141/1 |
| 5,353,880 A | | 10/1994 | Green |
| 5,511,535 A | | 4/1996 | Landstrom et al. |
| 5,713,265 A | | 2/1998 | Strader et al. |
| 5,799,595 A | | 9/1998 | Michelbrink et al. |
| 6,098,229 A | | 8/2000 | Ward |
| 6,158,426 A | | 12/2000 | Wardell |
| 6,167,797 B1 | | 1/2001 | Bollich |
| 6,182,559 B1 | | 2/2001 | Chiang |
| 6,631,712 B1 | * | 10/2003 | Koncelik, Jr. ............. 126/25 C |

\* cited by examiner

BARBECUE GRILL WITH ASH DISCHARGE

CONTINUING APPLICATION INFORMATION

This application is a Continuation-in-Part of specification having Ser. No. 09/907,176 and filed on 18 Jul. 2001 now U.S. Pat. No. 6,631,712.

BACKGROUND OF THE INVENTION

Field of the Invention

The present invention relates generally to a barbecue grill and more specifically to the discharge of the ash material contained within a barbecue grill as fertilizer to a user-designated area. The discharge is accomplished by introducing a quantity of water into the barbecue grill where the ash will be suspended in solution and delivered by means of conduit to a user specified area.

The barbecue grill ash discharge system of the present invention is comprised of a funnel-like device having a length of conduit suspended under a barbecue grill having a vent forming an aperture in the barbecue grill housing.

The funnel-like device has a diametric opening extending beyond the one or more aforementioned barbecue grill housing apertures constricting to a tube having a length of conduit attached thereto.

The present invention provides for a plurality of methods for suspending the funnel-like device under the barbecue grill that may be dependent upon the support structure for the barbecue grill. The method of suspension may also incorporate additional structural elements into the funnel-like device to aid in the attachment of said device to existing barbecue grills.

The present invention additionally provides for a selectively removable screening element that can be placed within the cavity of the funnel-like device to prevent clumping and discharge of large particles within the water ash slurry.

While other barbecue devices may be suitable for the purposes for which they were designed, they would not be as suitable for the purposes of the present invention, as hereinafter described.

SUMMARY OF THE PRESENT INVENTION

The present invention discloses a system and device(s) for the discharge of the ash material contained within a barbecue unit as fertilizer to a user designated area. The discharge is accomplished by introducing a quantity of water into the barbecue grill where the ash will be suspended in solution and delivered by means of a conduit to a user-specified area. The present invention provides a plurality of methods for discharging the material as revealed in the following illustrations. In one embodiment, the present invention is comprised of a funnel-like device having a removable sieve, drain hose with connector, and adjustable support legs. The combination provides means for removing ash from a barbecue grill. The funnel has a plurality of notches and tabs positioned within the rim. The tabs provide means for attaching adjustable legs that provide means for fixedly positioning the ash discharge device beneath a barbecue grill. Once positioned thereunder with the sieve placed within the funnel and a discharge hose fastened to the egress aperture of the funnel, ash can be removed by introducing a quantity of water which will flush the ash into the funnel through the sieve and along the discharge hose to some predetermined location. In other embodiments, the funnel is connected to the grill using straps or magnetic straps. The present invention can also be used with a public use barbecue grill with cover with a pipe forming an integral part therewith having a handle for varying the alignment of the ash drain and air vents. To discharge the ash, the vents are aligned. Water is introduced into the barbecue grill and on to the charcoal at the bottom of the grill. The resultant ash and water solution is washed out through the air duct holes at the bottom of the grill and into the support post drain pipe. The water and ash solution washes out through the drain pipe and into a discharge pipe that leads away from the grill to a desired location where it can be used as fertilizer. The present invention can also be employed on a yacht with ash drain tube beneath the barbecue grill and fed along to a dump port along the gunwale of a yacht. To discharge the ash, water is introduced into the barbecue grill and on to the charcoal at the bottom of the grill. The resultant ash and water solution is washed out through the drain duct holes at the bottom of the grill and into the drain tube. The water and ash solution washes out through the drain tube that leads away from the grill to a desired location along the gunwale where it is discharged through dump port into the drink.

A primary object of the present invention is to provide a device whereby the combustion remnant of a barbecue grill can be selectively delivered to a designated area as a fertilizer.

Another object of the present invention is to provide a barbecue grill water ash slurry distribution device.

Another object of the present invention is to provide a barbecue grill water ash slurry distribution device that can channel the water ash slurry to a user designated area.

Another object of the present invention is to provide a barbecue ash distribution device having a funnel-like device suspended beneath the barbecue grill housing vent aperture.

Another object of the present invention is to provide a barbecue ash distribution device having a funnel-like device with a length of conduit attached thereto.

Another object of the present invention is to provide a barbecue ash distribution device having suspension members whereby the funnel-like device can be positioned beneath the barbecue grill.

Another object of the present invention is to provide for an additional element for the funnel-like device in the form of a removable screen element that can be positioned within the funnel like device to prevent the passage of clumped ash or large particle matter.

Another object of the present invention is to provide a conical shaped screen element that can be positioned within the funnel like device to prevent the passage of clumped ash or large particle matter.

Additional objects of the present invention will appear as the description proceeds.

The present invention overcomes the shortcomings of the prior art by providing a device for the discharge of the ash material contained within a barbecue grill as fertilizer to a user designated area. The device is comprised of a funnel-like device having a length of conduit attached thereto that is suspended under a barbecue grill having a vent forming an aperture in the barbecue grill housing.

The funnel-like device has a large diametric opening extending beyond the barbecue grill housing apertures and constricts to a tube having a length of conduit attached thereto.

The distribution device of the present invention provides for a plurality of methods for suspending the funnel-like device under the barbecue grill. The method of suspension may also incorporate additional structural elements into the funnel-like device to aid in the attachment of said device to existing barbecue grills.

The present invention additionally provides for a selectively removable screening element that can be placed within the cavity of the funnel-like device to prevent clumping and discharge of large particles within the water ash slurry.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
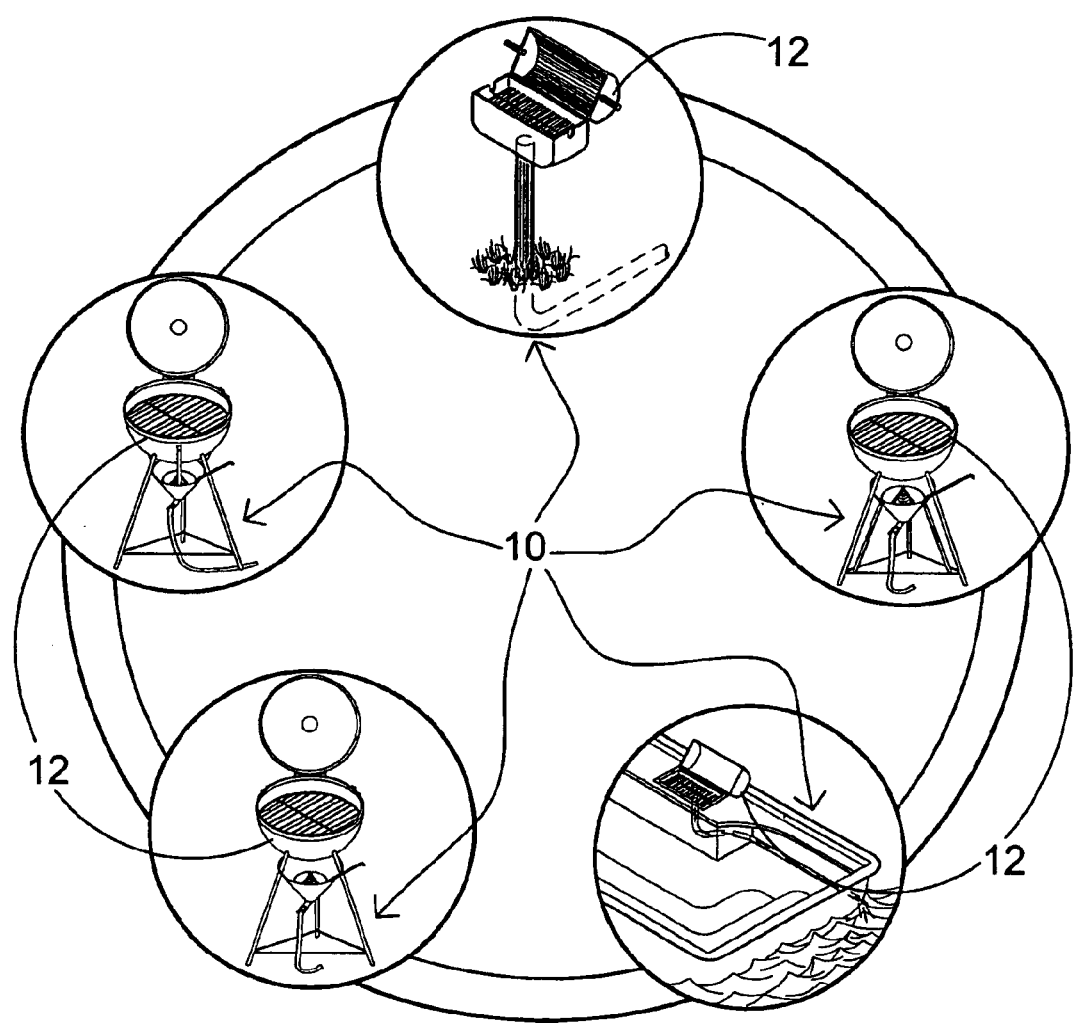
FIG. 1 is an illustrative view of the ash discharge system of the present invention.

With regard to reference numerals used, the following numbering is used throughout the drawings.

10 present invention
12 grill
14 funnel
16 sieve
18 drain hose
20 connector
22 funnel legs
24 tabs
26 rim
28 grill cover
30 slots
32 grill legs
34 grill rails
36 funnel strap
38 sieve handle
40 magnetic funnel strap
42 mesh
44 grill housing
46 notched area
48 latch
50 aperture
52 clevis pin
54 cotter pin
56 public grill
58 pipe
60 handle
62 cover
64 discharge pipe
66 above ground
68 below ground
70 water
72 water hose
74 discharge arrow
76 barbecue grill
78 cover
80 yacht
82 drain tube
84 dump port
86 length adjuster

DETAILED DESCRIPTION OF THE PREFERRED EMBODIMENT

The following discussion describes in detail one embodiment of the invention and several variations of that embodiment. This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the ash discharge system of the present invention 10 in use. The present invention 10 discloses a system and device(s) for the discharge of the ash material contained within a barbecue unit 12 as fertilizer to a user designated area. The discharge is accomplished by introducing a quantity of water into the barbecue grill 12 where the ash will be suspended in solution and delivered by means of a conduit to a user-specified area. The present invention 10 provides a plurality of methods for discharging the material as revealed in the following illustrations.

Figure 2:
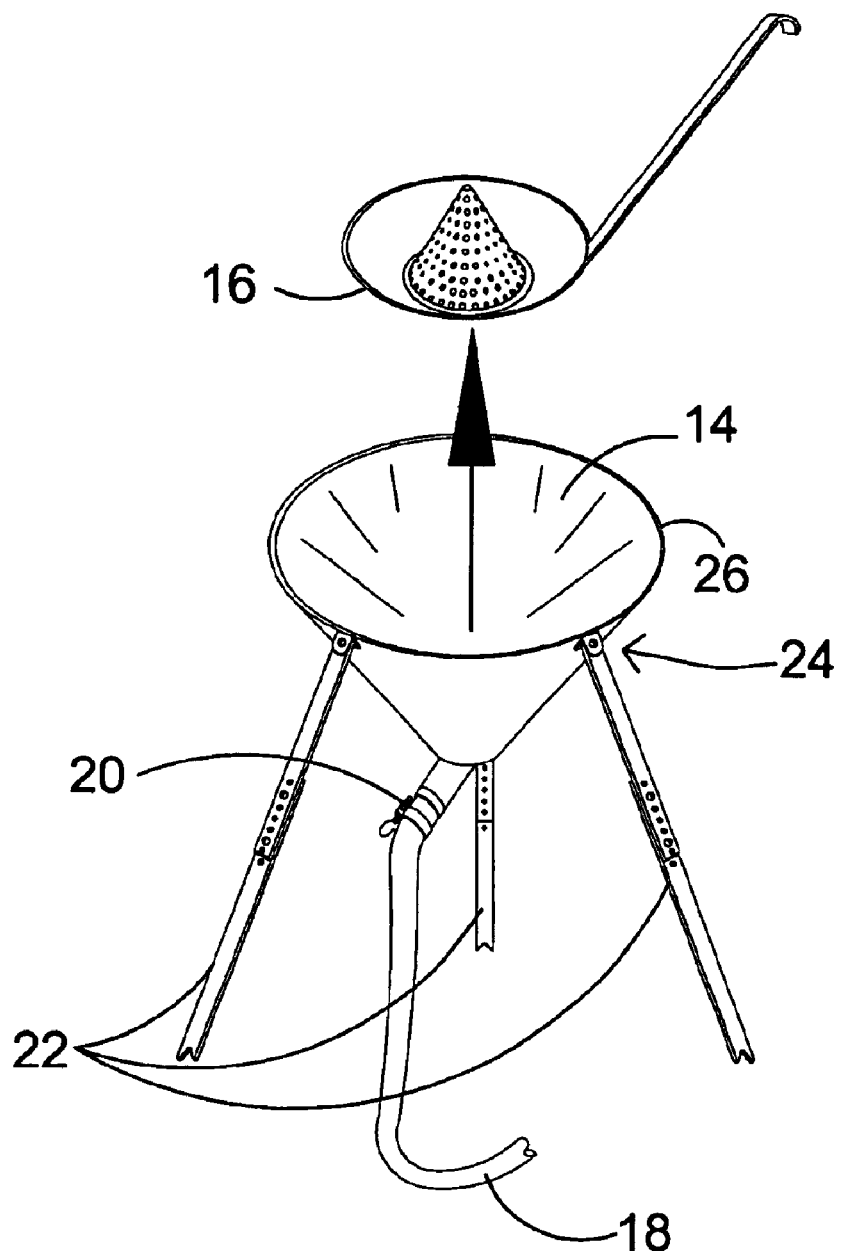
FIG. 2 is a detailed view of the ash discharge device of the present invention.

Turning to FIG. 2, shown therein is a detailed view of the ash discharge device of the present invention. Shown is the present invention comprised of a funnel-like device 14 having a removable screen or sieve 16, drain hose 18 with connector 20, and adjustable support legs 22. The combination provides means for removing ash from a barbecue grill. The funnel 14 has a plurality of notches and tabs 24 positioned within the rim 26. The tabs 24 provide means for attaching adjustable legs 22 that provide means for fixedly positioning the ash discharge device beneath a barbecue grill. Once positioned thereunder with the sieve 16 placed within the funnel 14 and a discharge hose fastened to the egress aperture of the funnel 14, ash can be removed by introducing a quantity of water which will flush the ash into the funnel 14 through the sieve 16 and along the discharge hose 18 to some predetermined location.

Figure 3:
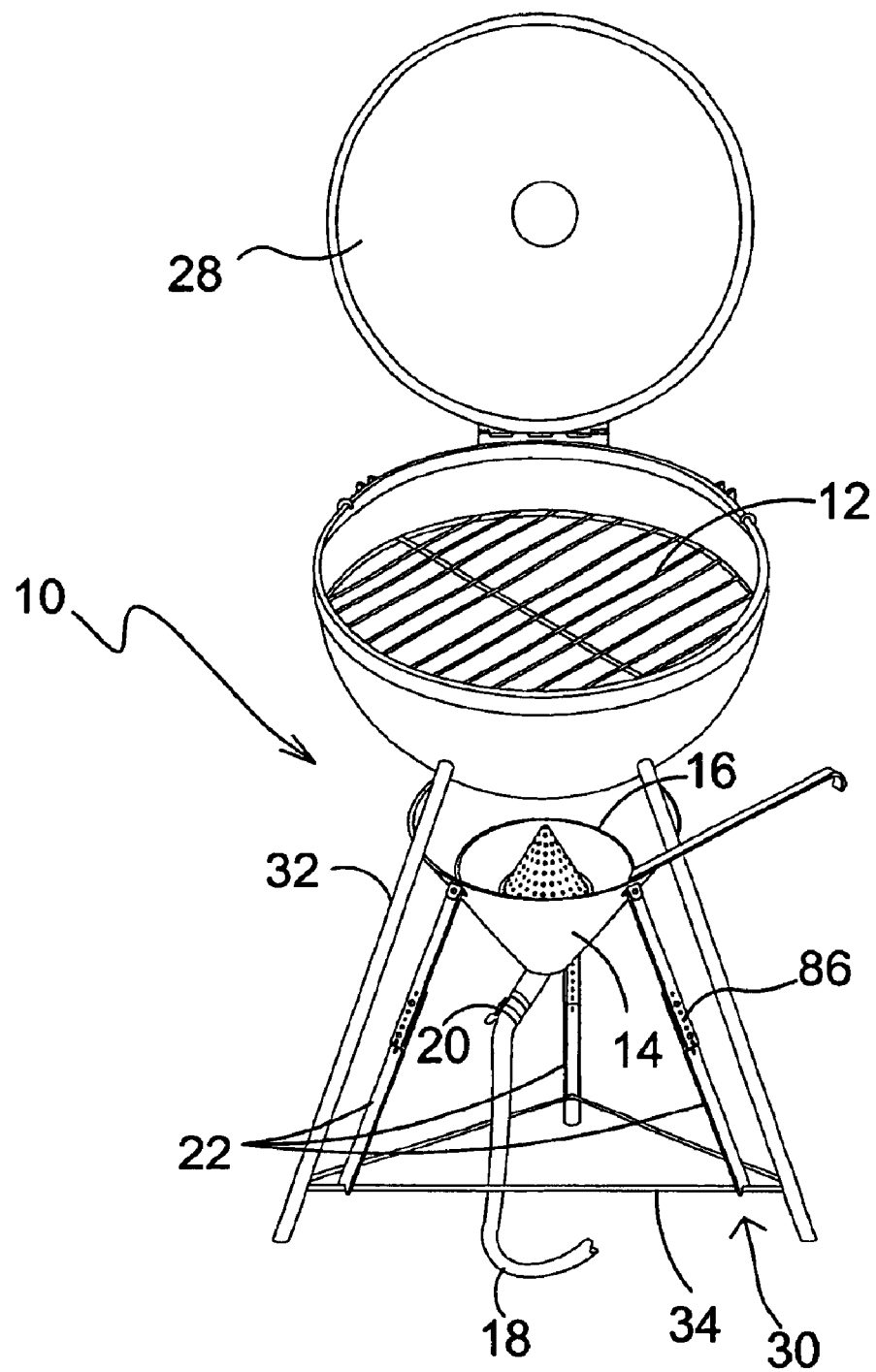
FIG. 3 is a perspective view of the ash discharge device of the present invention.

Turning to FIG. 3, shown therein is a perspective view of the present invention 10. Shown is the present invention 10 having a funnel-like device 14 with a plurality of notches and tabs positioned within the rim of the funnel. The funnel 14 is suspended beneath the barbecue grill 12 having a cover 28 thereon by adjusting at 86 the legs 22 to the desired length and attaching the funnel 14 by fasteners. The legs 22 have slots 30 at their distal ends for placement onto the barbecue grill legs 32 spacer rails 34. Once the tripod supported funnel 14 is placed onto the rails 34 and the sieve 16 is placed within the funnel 14 and a discharge hose fastened to the egress aperture of the funnel, ash can be removed by introducing a quantity of water which will flush the ash into the funnel 14 through the sieve 16 and along the discharge hose 18 with connector 20 to some predetermined location.

Figure 4:
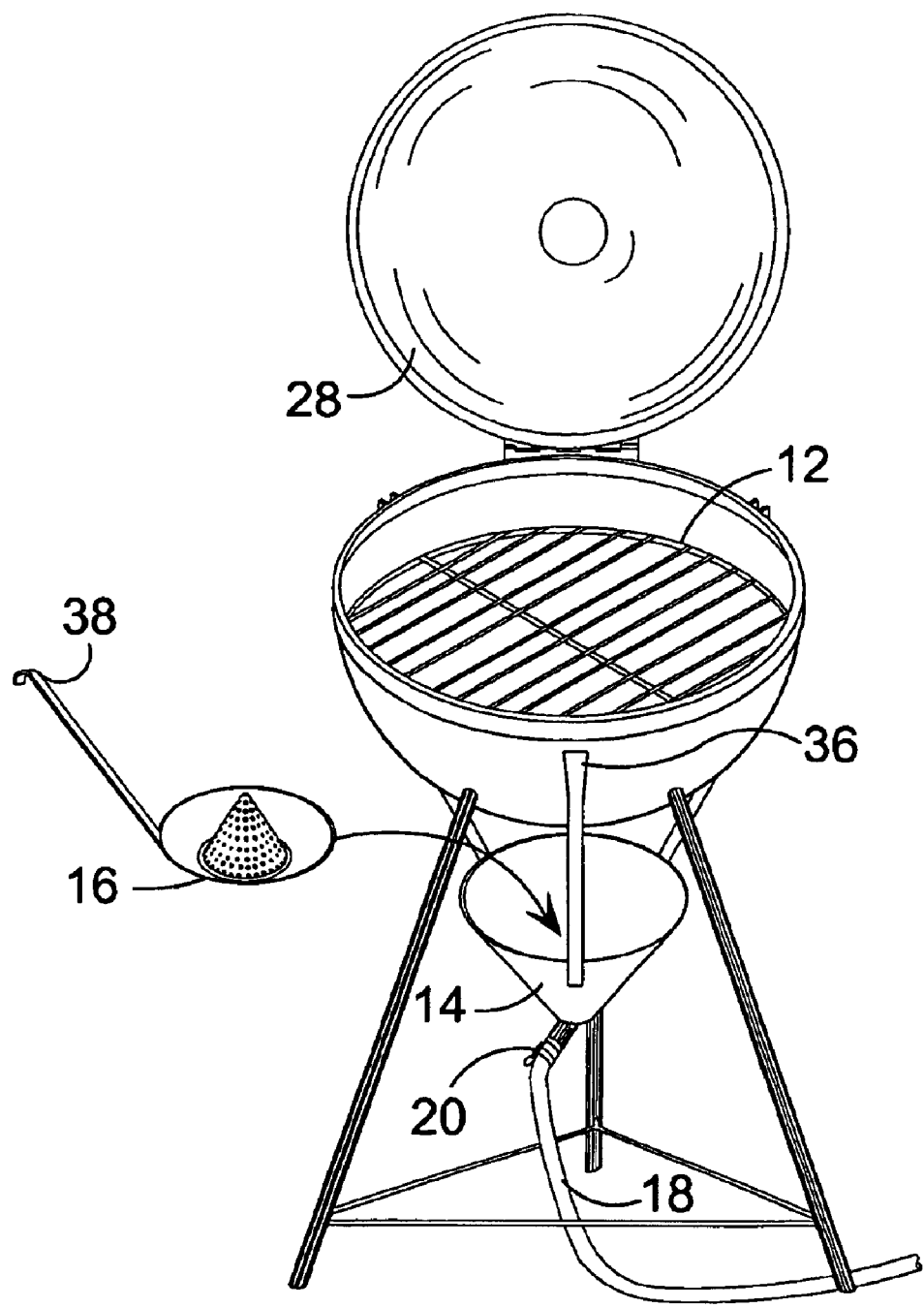
FIG. 4 is a perspective view of a barbecue having a funnel ash discharge system incorporated.

Turning to FIG. 4, shown therein is a perspective view of a barbecue grill 12 having a funnel ash discharge system incorporated therein. Shown is a barbecue grill 12 with cover 28 having a funnel like device 14 attached thereto and forming an integral part therewith by means of a plurality of straps 36. A removable sieve 16 having a handle 38 is provided to discharge the ash. Water is introduced into the barbecue grill 12 where it combines with the ash creating a slurry that is washed out through the air duct holes at the bottom of the grill falling into the funnel 14 that is suspended beneath the grill. The suspended particles being of smaller dimensions than the sieve 16 mesh flow into the discharge conduit 18 with connector 20 and are conducted by the conduit to a predetermined location where it can be used as potash (potassium) fertilizer.

Figure 5:
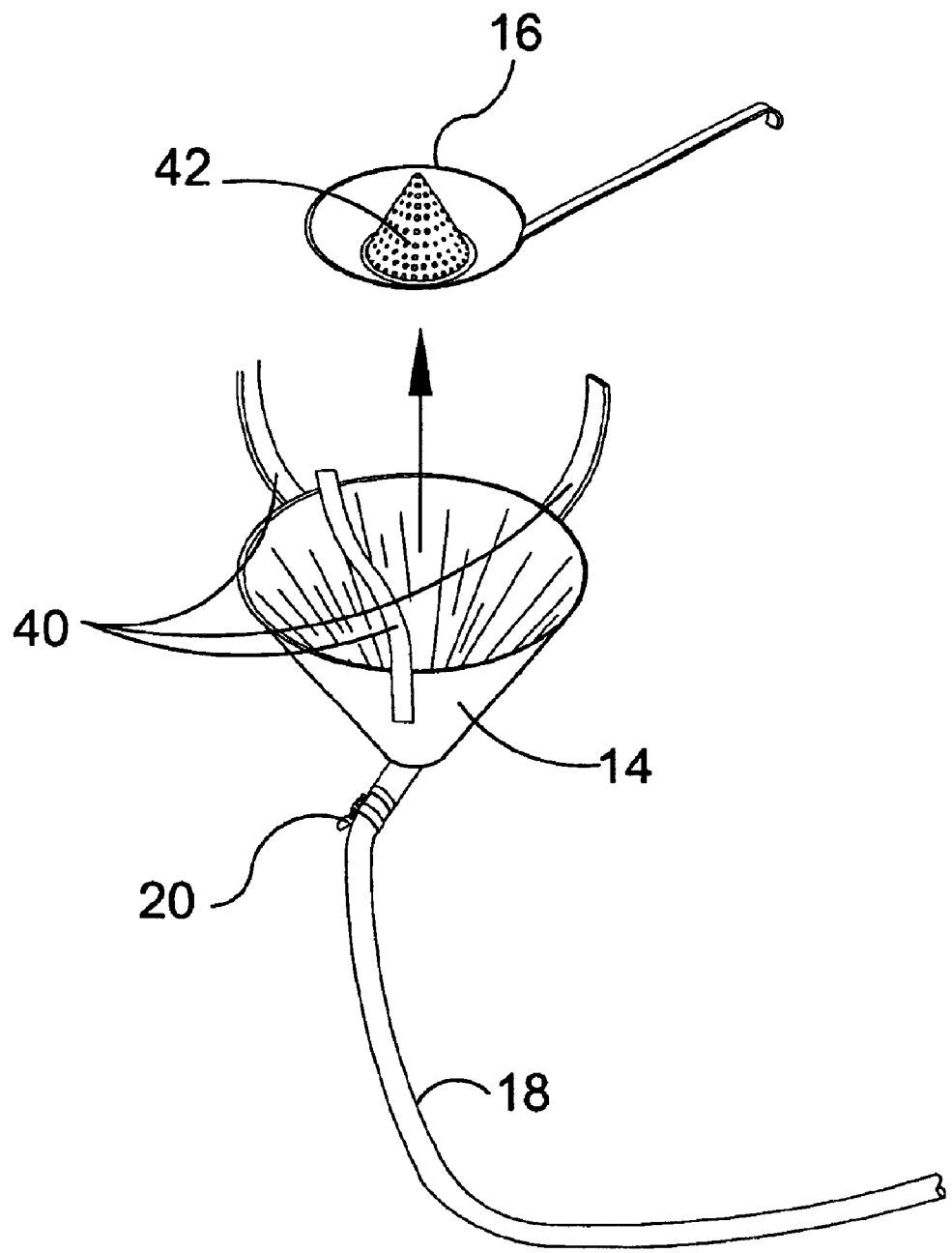
FIG. 5 is a detailed view of the ash discharge device of the present invention having an alternate means of attachment.

Turning to FIG. 5, shown therein is a detailed view of the ash discharge device of the present invention 10 having an alternate means of attachment. Shown is the present invention, having a funnel-like device 14 with a plurality of magnetic straps 40 extending therefrom whereby the funnel can be suspended beneath the barbecue grill by attaching the magnetic straps to the housing of the barbecue grill. A sieve 16 having a handle is removably positioned within the funnel for retaining objects greater than the size of the mesh 42 which can be removed and selectively disposed of as the final step in the ash removal process. To discharge the ash, water is introduced into the barbecue grill mixing with the ash thereby creating a slurry that gravitationally discharges through the barbecue air vents positioned at the base of the barbecue. The slurry passes into the funnel 14 that is suspended beneath the grill. The water and ash slurry pass through the sieve 16 and into a discharge hose 18 with connector 20 that leads away from the grill to a desired location where it can be used as potash (potassium) fertilizer.

Figure 6:
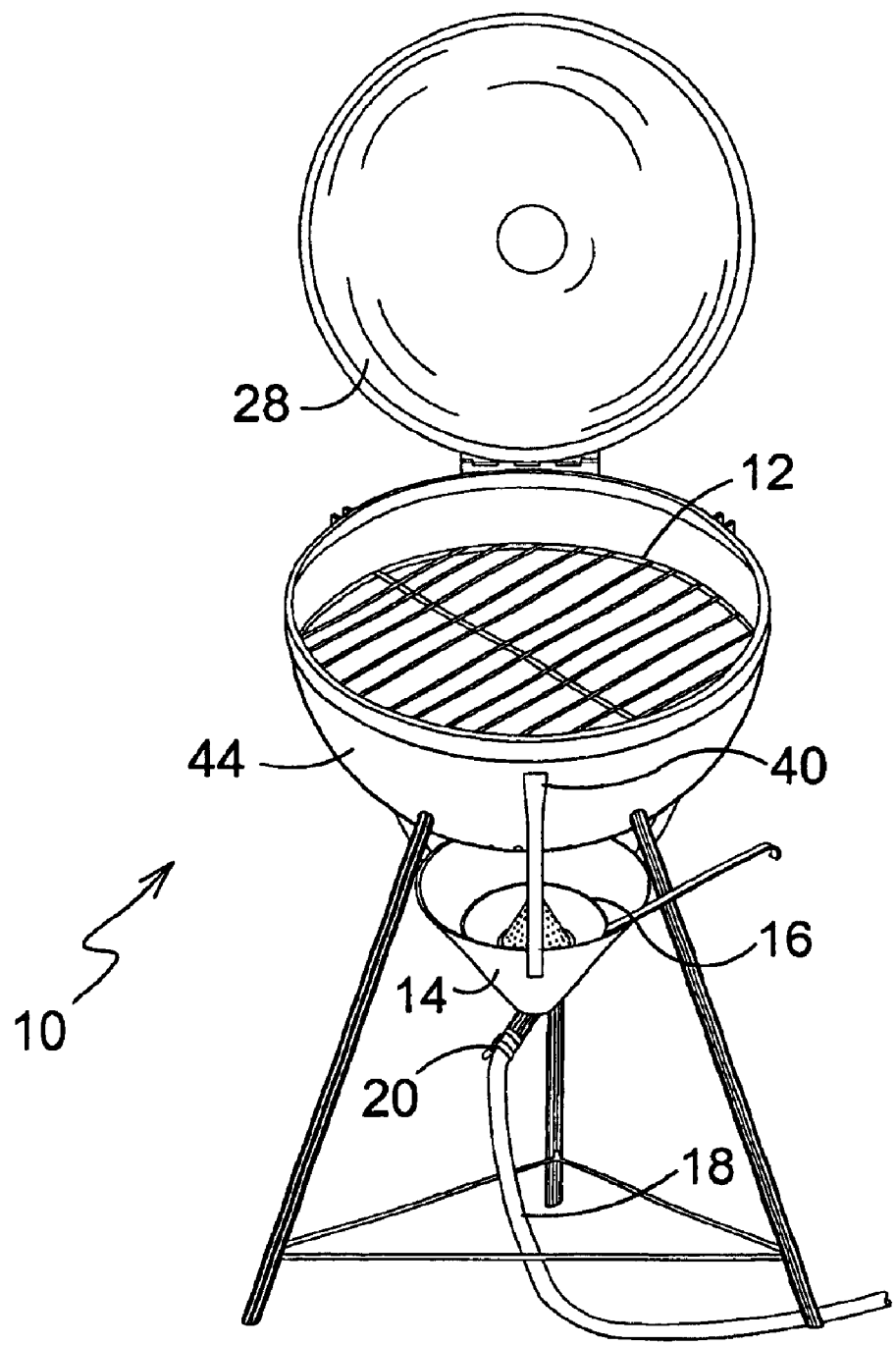
FIG. 6 is a perspective view of the funnel ash discharge system of the present invention having an alternate means of attachment.

Turning to FIG. 6, shown therein is a perspective view of the present invention 10 having an alternate means of attachment. Shown is the present invention 10 having a funnel 14 like device with a plurality of magnetic straps 40 fastened to the funnel and extending therefrom whereby the funnel can be suspended beneath the barbecue grill 12 with cover 28 by attaching the magnetic straps 40 to the housing 44 of the barbecue grill where it combines with the ash creating a slurry that is washed out through the air duct holes at the bottom of the grill falling into the funnel 14 that is suspended beneath the grill 12. The suspended particles being of smaller dimensions than the sieve 16 mesh flow into the discharge conduit 18 with connector 20 and are conducted by the conduit to a predetermined location where it can be used as potash (potassium) fertilizer.

Figure 7:
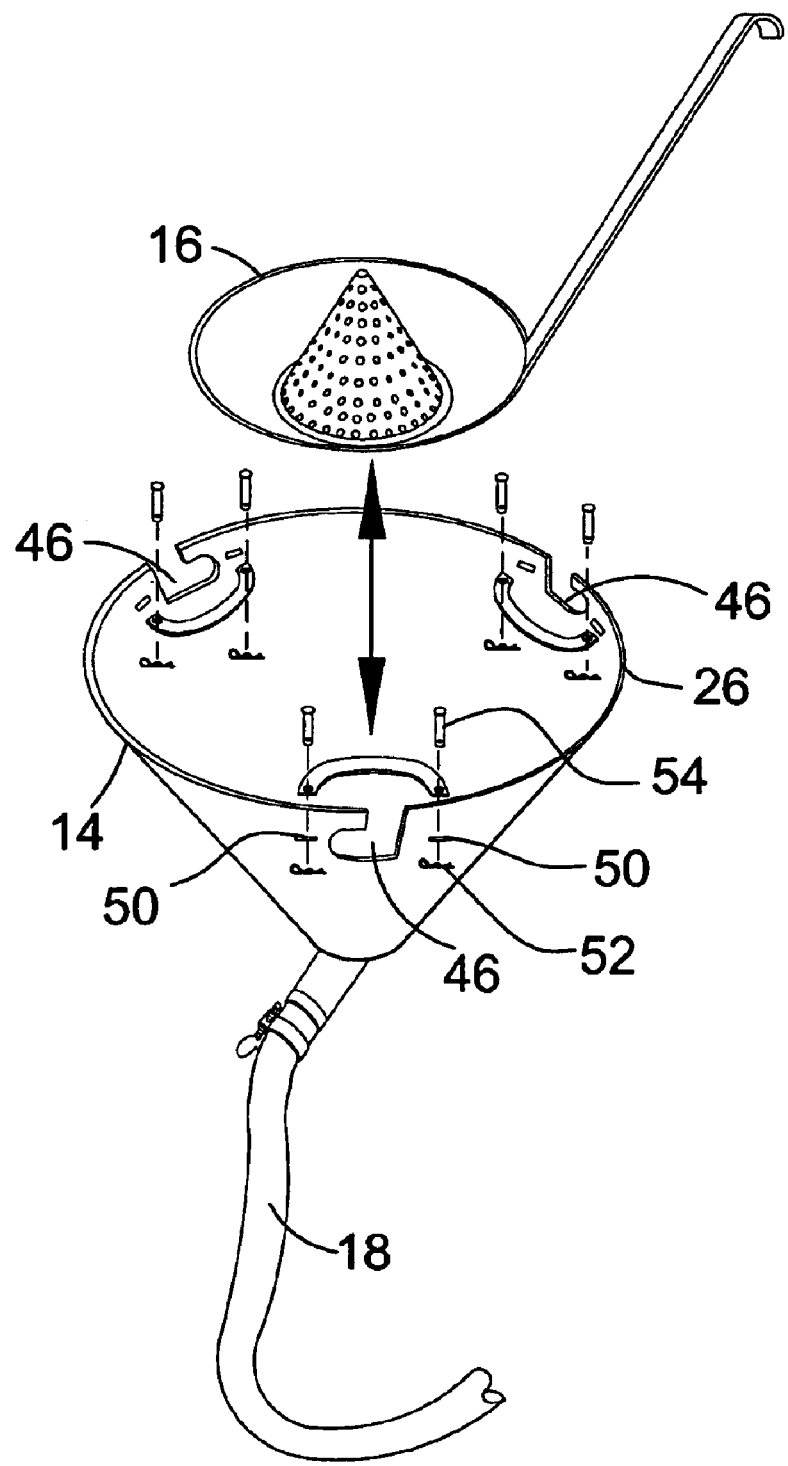
FIG. 7 is a detailed view of the ash discharge device of the present invention having an alternate means of attachment.

Turning to FIG. 7, shown therein is a detailed view of the ash discharge device of the present invention having an alternate means of attachment. Shown is the present invention having a removable sieve 16 and a drain hose 18. The combination provides means for removing ash from a barbecue grill. The funnel 14 having a plurality of L-shaped notches 46 positioned within the rim 26 discloses an additional means for fixedly positioning the ash discharge device beneath a barbecue grill. Once positioned thereunder a latch 48 is placed over the leg with the distal ends of the latch placed through apertures 50 within the funnel wall. Then clevis pins 52 are placed into the apertures 50 located at the distal ends of the latch 48 and secured by cotter pins 54.

Figure 8:
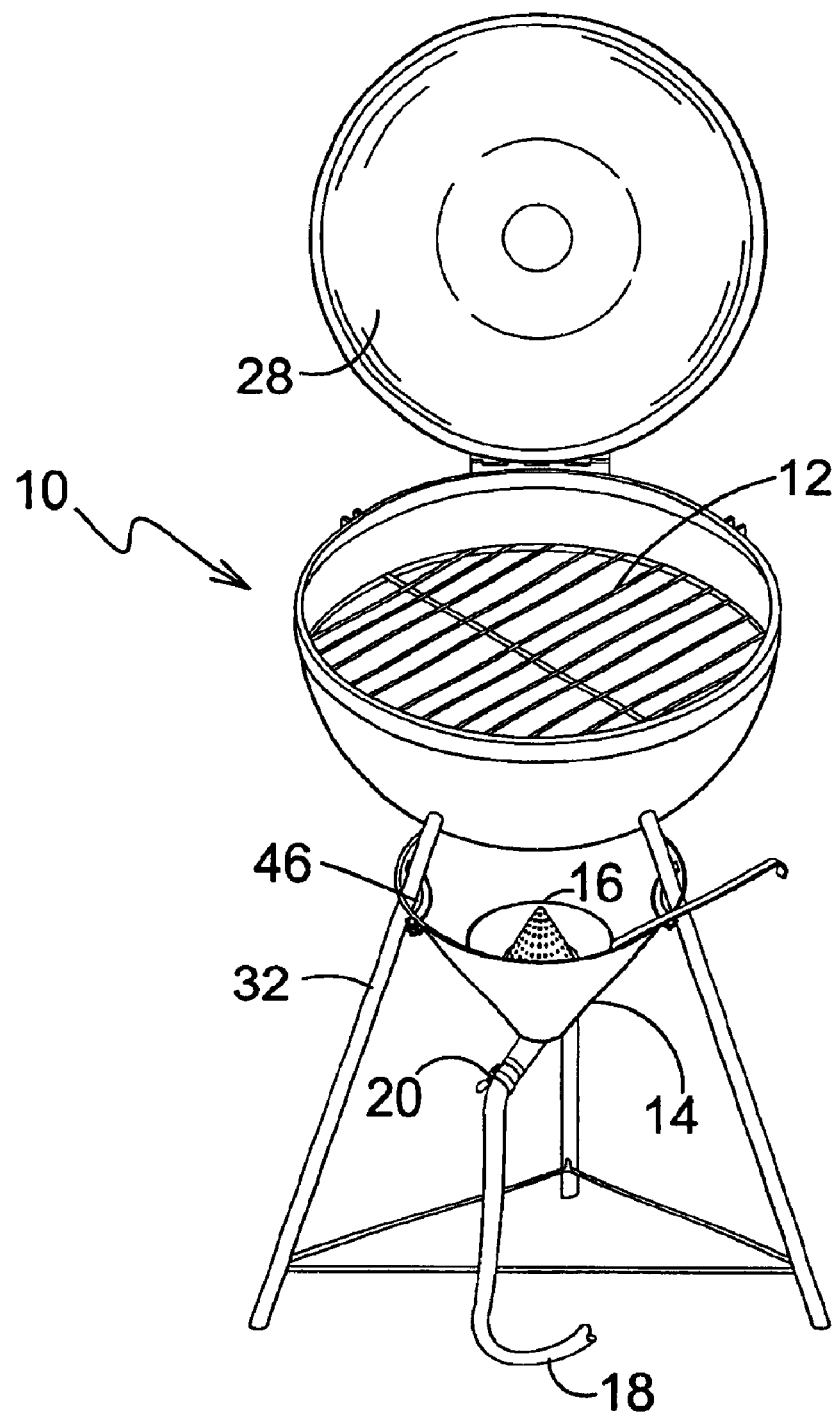
FIG. 8 is a perspective view of the ash discharge device of the present invention with an alternate attachment means.

Turning to FIG. 8, shown therein is a perspective view of the ash discharge device of the present invention 10 with an alternate attachment means. Shown is the present invention 10 having a funnel-like device 14 with a plurality of L-shaped notches positioned within the rim of the funnel. The funnel 14 is suspended beneath the barbecue grill 1 with cover 28 by aligning the notches 46 of the funnel with the legs 32 of the barbecue. Once aligned, the funnel 14 is moved until the base of the notches engage the barbecue legs 32 whereupon the funnel is rotated until the barbecue legs are seated within the short leg of the L-shaped slot. Also shown are outlet hose 18 with connector 20.

Figure 9:
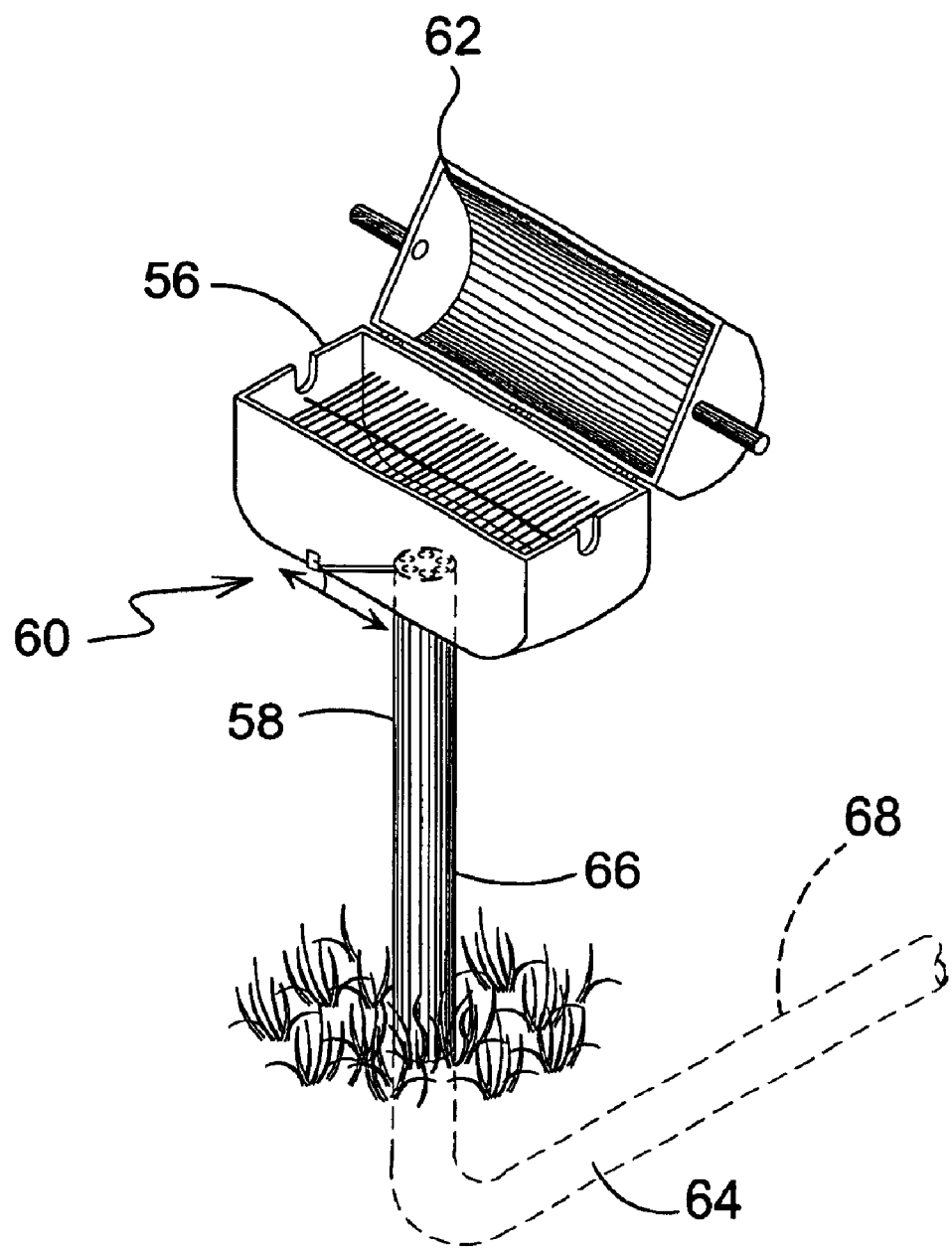
FIG. 9 is a perspective view of a public use of the ash discharge system of the present invention funnel.

Turning to FIG. 9, shown therein is perspective view of a public use of the present invention 10. Shown is the present invention having a public use barbecue grill 56 with cover 62 with a pipe 58 forming an integral part therewith having a handle 60 for varying the alignment of the ash drain and air vents. To discharge the ash, the vents are aligned. Water is introduced into the barbecue grill 56 and on to the charcoal at the bottom of the grill. The resultant ash and water solution is washed out through the air duct holes at the bottom of the grill and into the support post drain pipe 58. The water and ash solution washes out through the drain pipe 58 and into a discharge pipe 64 that leads away from the grill to a desired location where it can be used as fertilizer. Also shown is above ground at 66 and below ground at 68.

Figure 10:
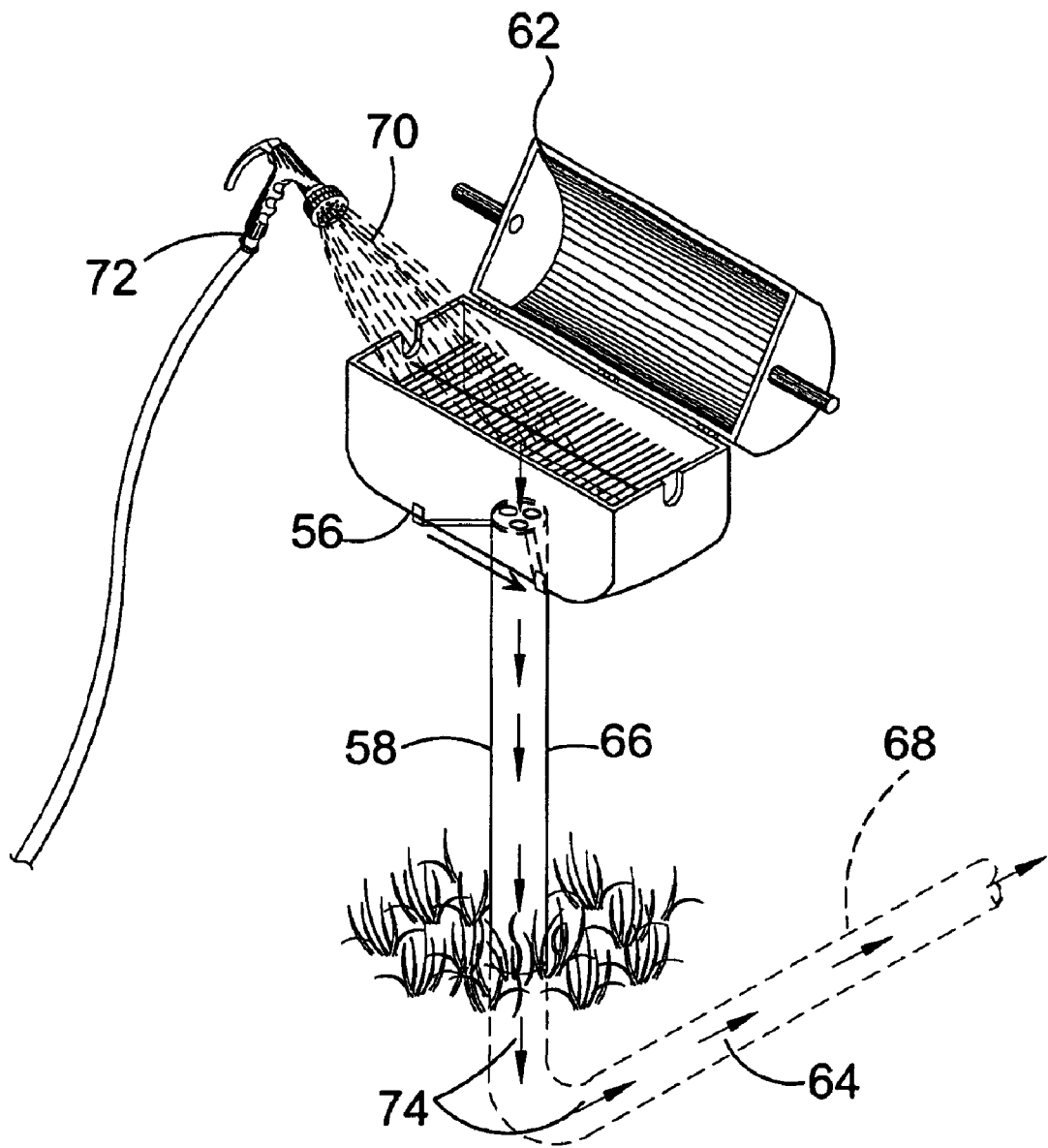
FIG. 10 is perspective view of a public use of the ash discharge system of the present invention.

Turning to FIG. 10, shown therein is a perspective view of a public use of the present invention. Shown is the present invention having a public use barbecue grill 56 with ash drain pipe 58 through the support post 58 beneath the barbecue grill. To discharge the ash, water 70 is introduced through water hose 72 into the barbecue grill 56 with cover 62 and on to the charcoal at the bottom of the grill. The resultant ash and water solution is washed out through the air duct holes at the bottom of the upwardly concave grill and into the support post drain pipe 58 above ground 66 and into a discharge pipe that leads away from the grill 56 to a desired location where it is used as potash (potassium) fertilizer. Also shown is the discharge arrow 74, discharge pipe 64 being below ground 68.

Figure 11:
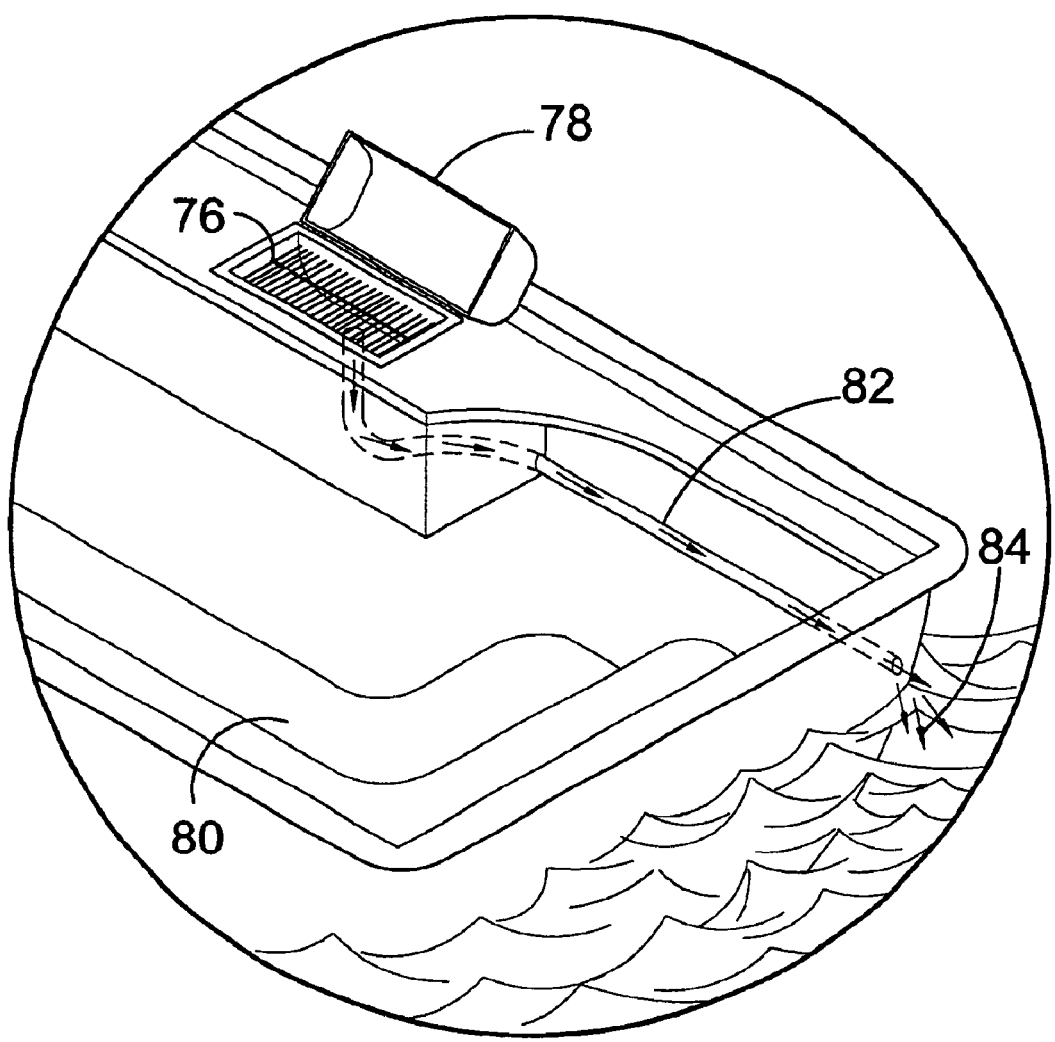
FIG. 11 is a perspective view of a private use of the ash discharge system of the present invention.

Turning to FIG. 11, shown therein is a perspective view of a private use of the present invention. Shown is the present invention having a private built-in barbecue grill 76 with cover 78, such as employed on a yacht 80 or other water vessel with ash drain tube 82 beneath the barbecue grill and feed along to a dump port 84 along the gunwale of a yacht. To discharge the ash, water is introduced into the barbecue grill 76 and on to the charcoal at the bottom of the grill. The resultant ash and water solution is washed out through the drain duct holes at the bottom of the grill and into the drain tube 82. The water and ash solution washes out through the drain tube 82 that leads away from the grill to a desired location along the gunwale where it is discharged through dump port 84 into the drink.

I claim:

1. An apparatus for removing the ash from a cooking grill using fluid flow in combination, comprising:

a) a cooking grill, said grill being upwardly concave having a bottom therein and a rim about its upper edge, wherein said grill is supported by a plurality of legs, wherein said legs have a plurality of substantially horizontal grill rails disposed between said legs to provide structural support;

b) said bottom of said grill having a plurality of holes therein through which fluid can flow;

c) a funnel disposed beneath said holes of said bottom of said grill for collecting the fluid, said funnel having an enlarged inlet end and a smaller outlet end;

d) means for attaching said funnel beneath said grill whereby the funnel is secured beneath said holes in said bottom of said grill;

e) a source of water directed from above onto the ash in said bottom of said grill for hydraulically removing the ash;

f) means for an outlet disposed onto said funnel for directing the water flow away from said funnel;

g) a removable screen disposed in said funnel so that the screen will separate large ash pieces from the fluid flow;

h) a handle being disposed on said screen to permit a user to move the screen about, wherein said means for attaching said funnel beneath said grill comprises:
   i) a plurality of funnel legs disposed under said funnel to provide support for said funnel, said funnel legs having first and second opposing ends, said second ends having slots disposed therein; and,
   ii) wherein said first ends of said legs are connected to said outer inlet end of said funnel and said slots are disposed on said grill rails to permit the funnel to be disposed beneath the grill.

2. The apparatus of claim 1, further comprising a length adjuster being disposed on each said funnel leg between said first and second ends to permit the length of the funnel legs to be adjusted.

* * * * *